United States Patent
Spencer

[11] 3,981,665
[45] Sept. 21, 1976

[54] PRESS HAVING TORQUE RESPONSIVE DRIVE COUPLING

[75] Inventor: Robert Spencer, Stroud, England

[73] Assignee: Simon-Barron Limited, Gloucester, England

[22] Filed: Oct. 2, 1975

[21] Appl. No.: 619,009

[30] Foreign Application Priority Data

Nov. 9, 1974 United Kingdom............... 48588/74

[52] U.S. Cl.................................. 425/331; 64/12; 403/335
[51] Int. Cl.² .......................................... B28B 3/12
[58] Field of Search ........... 425/331, 311, 363, 365, 425/374; 403/335, 336, 338, 356, 358; 64/12, 19, 24

[56] References Cited
UNITED STATES PATENTS

| | | | |
|---|---|---|---|
| 2,096,999 | 10/1937 | Sarazin | 64/19 |
| 3,010,150 | 11/1961 | Meakin | 425/331 |
| 3,108,055 | 10/1963 | Grant | 425/331 X |
| 3,382,818 | 5/1968 | Landers | 425/331 |
| 3,664,153 | 5/1972 | Sugahara | 64/19 X |

Primary Examiner—Richard B. Lazarus
Attorney, Agent, or Firm—Norris & Bateman

[57] ABSTRACT

A press of the kind for the preparation of pellets of cattle feed or other pelletisable material and comprising an annular die having a plurality of radial bores therein, which is mounted on a driving rim for rotation around a stationary support fitted with a number of pressure rollers, each freely rotatable on a stationary shaft and in closely spaced relationship with the interior surface of the die, the arrangement being such that material fed into the interior of the die is forced through the bores therein by the action of said pressure rollers, characterized in that the die and driving rim therefor are provided with complementary circumferential mating male and female conical surfaces, there being a plurality of circumferentially spaced links each of which is arranged to be pivotally connected at its opposed ends to the driving rim and die respectively such that transmission of torque from the driving rim to the die causes pivoting movement of said links to bring said mating surfaces into pressurised engagement.

14 Claims, 7 Drawing Figures

PRESS HAVING TORQUE RESPONSIVE DRIVE COUPLING

This invention concerns a press of the kind (hereinafter termed of the kind referred to) for the preparation of pellets of cattle feed or other pelletisable material and comprising an annular die having a plurality of radial bores therein, which is mounted on a driving rim for rotation around a stationary support fitted with a number of pressure rollers, each freely rotatable on a stationary shaft and in closely spaced relationship with the interior surface of the die, the arrangement being such that material fed into the interior of the die is forced through the bores therein by the action of said pressure rollers.

In conventional presses of the kind referred to the annular die is secured to the driving rim by bolts which extend in a direction parallel with the central axis of the die or is secured by a bolted circumferential clamp.

It will thus be understood that it is necessarily a tedious and time consuming operation to remove and replace a die on the press for cleaning, maintenance or other purposes.

It is an object of the present invention to provide a press of the kind referred to wherein the means for securing the die to the driving rim therefor are such as to permit more ready removal and replacement of the die.

Thus, according to the present invention, a press of the kind referred to is characterised in that the die and driving rim therefor are provided with complementary circumferential mating male and female conical surfaces, there being a plurality of circumferentially spaced links each of which is arranged to be pivotally connected at its opposed ends to the driving rim and die respectively such that transmission of torque from the driving rim to the die causes pivoting movement of said links to bring said mating surfaces into pressurised engagement.

The invention will be further apparent from the following description with reference to the figures of the accompanying drawings which show, by way of example only, three forms of press of the kind referred to and embodying the invention.

Figure 1:
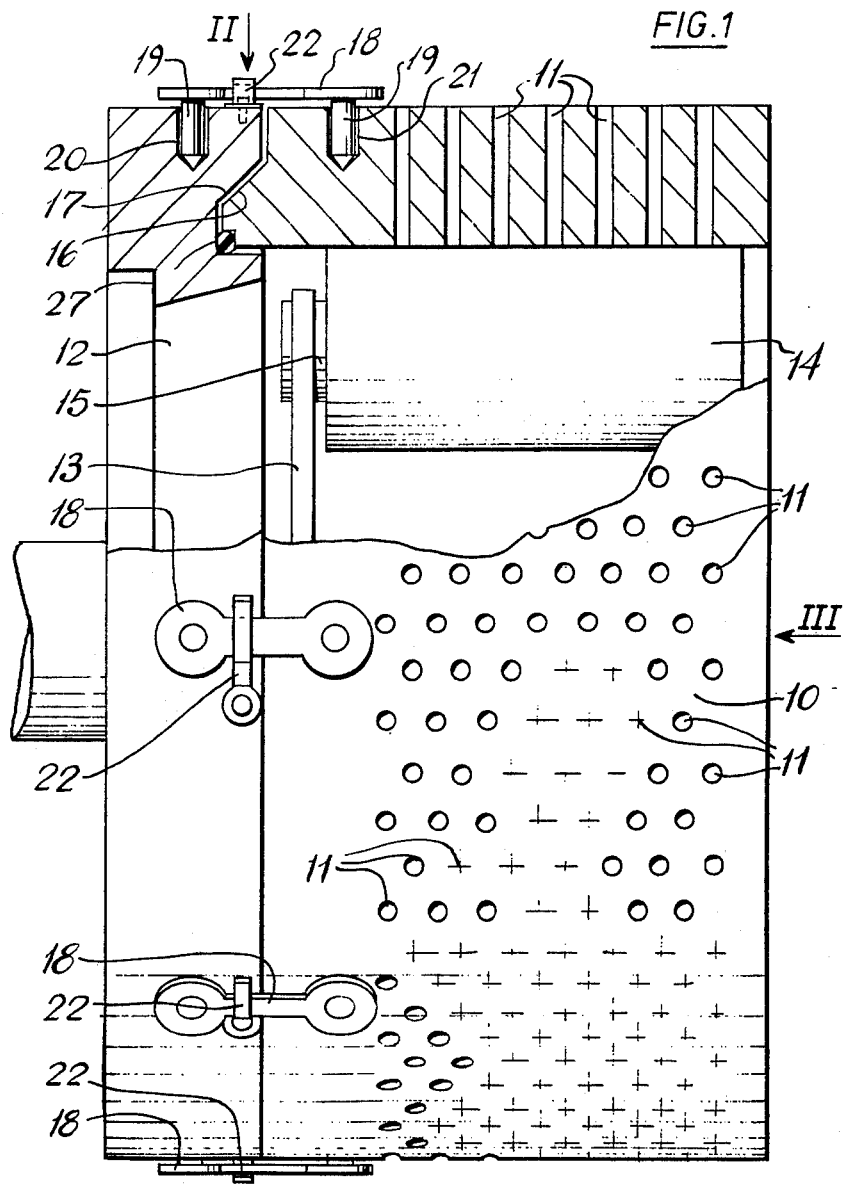
FIG. 1 shows a partially sectioned perspective and diagrammatic view of the first form of press.
Figure 5:
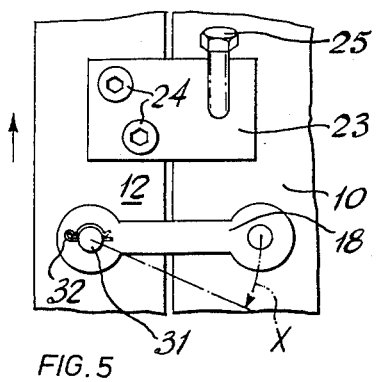
Figure 2:
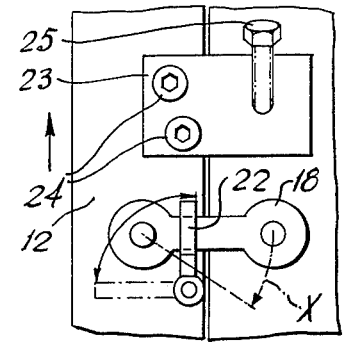
FIG. 2 shows a fragmentary view of the press seen in the direction of the arrow II on FIG. 1.
Figure 4:
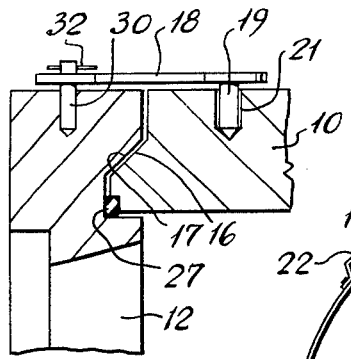
Figure 7:
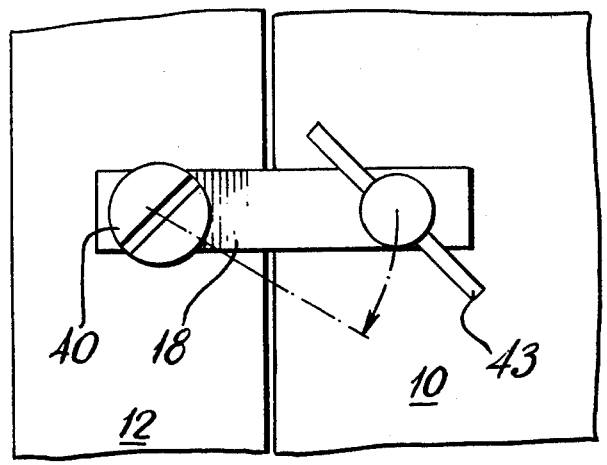
Figure 6:
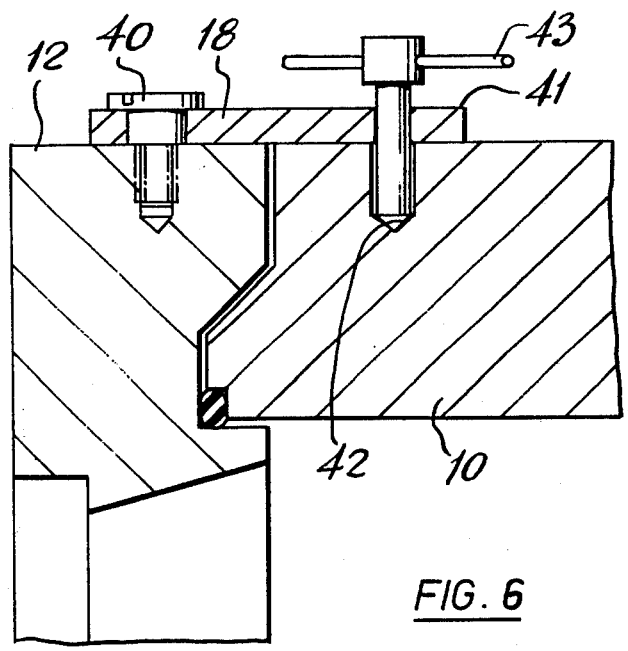

FIGS. 4 and 5 are fragmentary views corresponding with FIGS. 1 and 2 but of a second form of press having a modified construction; and FIGS. 6 and 7 are fragmentary views corresponding with FIGS. 1 and 2 but of a third form of press having a modified construction.

Figure 3:
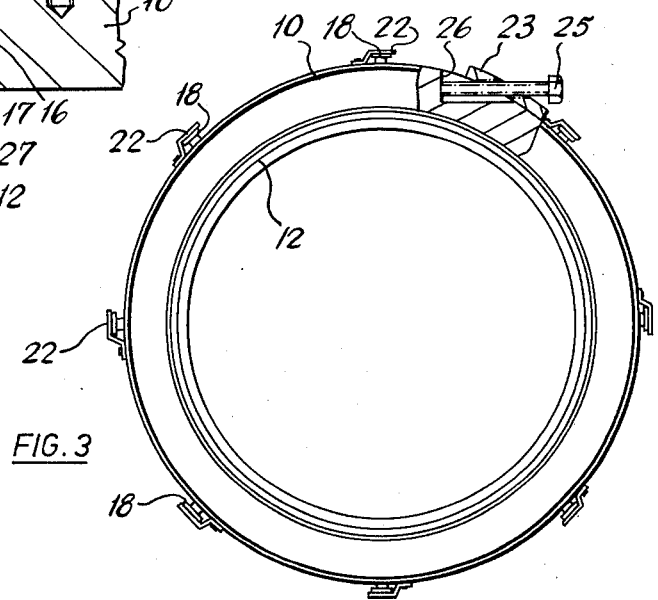
FIG. 3 shows a partially sectioned end view of the press seen in the direction of the arrow III on FIG. 1.

Referring now to FIGS. 1 to 3 of the drawings it will be seen that the first form of press, in known manner, essentially comprises an annular die 10 having a multiplicity of radial bores 11 therethrough, and which is arranged with its central axis extending in a horizontal direction. The die 10 is secured by one of its ends to a driving rim 12 for rotation about a stationary support 13 disposed within the interior of the die 10. The stationary support 13 carries a number (usually two) of equi-angularly spaced pressure rollers 14, each freely rotatable about a stationary shaft 15 such that its periphery is closely spaced from the interior peripheral surface of the die 10.

In use, material, such as cattle feed for example, which is to be pelletised is fed to the interior of the die 10 whilst the latter is rotated. The pressure rollers 14 force such material through the bores 11 and the material extruded through the die to the outside surface thereof is severed by knife means (not shown) to form pellets of the required length.

In accordance with the invention, the die 10 and driving rim 12 are formed with mating male and female conical surfaces 16 and 17 respectively, which extend circumferentially around the opposed end faces of the die 10 and driving rim 12. Usually a mating surface will be provided on both ends of the die to permit its reversal.

A plurality of links 18 are provided at equi-angularly spaced intervals around the die 10. Each link 18 extends in a generally axial direction and has pins 19 secured thereto and projecting inwardly therefrom at each of its opposed ends. The pins 19 are located in blind radially extending bores 20 and 21 formed in the driving rim 12 and die 10 respectively. In this way each of the links 18 is pivotally connected at its opposed ends to the driving rim 12 and die 10 respectively. Spring clips 22 are provided to prevent the links 18 from being displaced outwardly either by gravity or by centrifugal forces when the die 10 is rotated.

A bracket member 23 is secured by screws 24 to the driving rim 12 and extends axially to overlie the periphery of the die 10. A screw 25 is threadedly connected with a bore in the bracket 23 such that its lower end engages an abutment 26 defined by a recess in the die 10.

In use, a die 10 is positioned on the driving rim 12 such that the mating male and female surfaces 16 and 17 are engaged. The links 18 are fitted in position and their retaining clip 22 secured. The screw 25 is then tightened to cause slight rotational movement of the die 10 relative to the driving rim 12 such that the links pivot in the direction of the arrow X, thus to force the surfaces 16 and 17 into pressurised engagement.

In this way torque can be transmitted from the driving rim 12 to the die 10 by friction at the surfaces 16 and 17, when the press is in operation. It will be appreciated that the greater the torque required to drive the die 10 the greater the tendency for the links 18 to pivot further and thus force the surfaces 16 and 17 together more firmly.

A resilient ring 27 is provided between the parts 10 and 12 to form a seal.

It will be appreciated that it is not intended to limit the invention to the above example only, many variations, such as might readily occur to one skilled in the art, being possible without departing from the scope thereof.

Thus, for example, the press may have a modified construction as shown in FIGS. 4 and 5, wherein like parts are indicated by like reference numerals.

In this form of press the pin 19 on the end of each link 18 overlying the driving rim 12 is replaced by a peg 30 projecting radially outwardly from the rim 12 and passing through an aperture 31 in the link 18. The link 18 is secured over the peg 30 by means of a spring clip 32, thus eliminating the need for the retaining clip 22.

Again, for example, the press may have a still different construction, and as shown in FIGS. 6 and 7, wherein like parts are again indicated by like reference numerals.

In this form of press, each link 18 is pivotally connected to the driving rim 12 by means of a locating screw 40 and a downwardly sprung loaded plunger 41 is provided and adapted to engage a blind bore 42 in the die 10 to form the pivotal connection between the link 18 and die 10. The plunger 41 is provided with a handle 43 readily permitting its manual movement between positions engaging the bore 42 and withdrawn therefrom when the link 18 may be swung aside.

Yet again, for example, all of the arrangements described above may be modified by having the male and female conical mating surfaces provided on the driving rim and annular die respectively instead of on the annular die and driving rim as shown in the accompanying drawings.

What is claimed is:

1. A press of the kind for the preparation of pellets of cattle feed or other pelletisable material and comprising an annular die having a plurality of radial bores therein, which is mounted on a driving rim for rotation around a stationary support fitted with a number of pressure rollers, each freely rotatable on a stationary shaft and in closely spaced relationship with the interior surface of the die, the arrangement being such that material fed into the interior of the die is forced through the bores therein by the action of said pressure rollers, characterised in that the die and driving rim therefor are provided with complementary circumferential mating male and female surfaces, there being a plurality of circumferentially spaced links each of which is arranged to be pivotally connected at its opposed ends to the driving rim and die respectively such that transmission of torque from the driving rim to the die causes pivoting movement of said links to bring said mating surfaces into pressurised engagement.

2. A press according to claim 1 wherein each said link has a pin projecting therefrom at each of its ends, there being, for each said link, a blind radially extending bore in the driving rim and a blind radially extending bore in the annular die in which the pins of said link can be located, and there being clip means associated with each link for securing same in position with its pins located in said blind bores.

3. A press according to claim 1 wherein each said link has a pin projecting from one of its ends and an aperture in the other of its ends, there being, for each said link, a radially outwardly projecting peg on the driving rim and a radial blind bore in the die, such that the link can be located with said peg passing through the aperture in the link and said pin located in the blind bore, there being clip means associated with each link for securing same in position.

4. A press according to claim 3 wherein said clip means is comprised by a spring clip adapted to be engaged with the free end of the peg after the link has been fitted thereover.

5. A press according to claim 1 wherein each said link is pivotally secured to the driving rim by means of a locating screw, there being a spring-loaded plunger on the end of the link remote from said locating screw and capable of movement between a first position wherein it projects downwardly to engage with a radial blind bore in the annular die and a second position wherein it is withdrawn therefrom.

6. A press according to claim 1 wherein said male and female surfaces are provided on the annular die and driving rim respectively.

7. A press according to claim 5 wherein said male and female surfaces are provided on the annular die and driving rim respectively.

8. A press according to claim 1 wherein said female and male surfaces are provided on the annular die and driving rim respectively.

9. A press accordinng to claim 5 wherein said female and male surfaces are provided on the annular die and driving rim respectively.

10. A press according to claim 1 wherein a screw is associated with one of the parts defined by the annular die and the driving rim and adapted to engage with an abutment on the other of said parts whereby rotation of the screw causes relative rotational movement between the annular die and the driving rim to cause pivoting movement of the links thus to draw said mating surfaces together.

11. A press according to claim 6 wherein a screw is associated with one of the parts defined by the annular die and the driving rim and adapted to engage with an abutment on the other of said parts whereby rotation of the screw causes relative rotational movement between the annular die and the driving rim to cause pivoting movement of the links thus to draw said mating surfaces together.

12. A press according to claim 7 wherein a screw is associated with one of the parts defined by the annular die and the driving rim and adapted to engage with an abutment on the other of said parts whereby rotation of the screw causes relative rotational movement between the annular die and the driving rim to cause pivoting movement of the links thus to draw said mating surfaces together.

13. A press according to claim 8 wherein a screw is associated with one of the parts defined by the annular die and the driving rim and adapted to engage with an abutment on the other of said parts whereby rotation of the screw causes relative rotational movement between the annular die and the driving rim to cause pivoting movement of the links thus to draw said mating surfaces together, 14. A press according to claim 9 wherein a screw is associated with one of the parts defined by the annular die and the driving rim and adapted to engage with an abutment on the other of said parts whereby rotation of the screw causes relative rotational movement between the annular die and the driving rim to cause pivoting movement of the links thus to draw said mating surfaces together.

* * * * *